US009494306B1

(12) United States Patent
Newton

(10) Patent No.: US 9,494,306 B1
(45) Date of Patent: *Nov. 15, 2016

(54) ADJUSTABLE MOUNTING SYSTEM FOR A LUMINAIRE

(71) Applicant: Cooper Technologies Company, Houston, TX (US)

(72) Inventor: Chad Stuart Newton, Tyrone, GA (US)

(73) Assignee: Cooper Technologies Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/607,751

(22) Filed: Jan. 28, 2015

Related U.S. Application Data

(63) Continuation of application No. 13/854,290, filed on Apr. 1, 2013, now Pat. No. 8,960,971.

(60) Provisional application No. 61/619,018, filed on Apr. 2, 2012.

(51) Int. Cl.
*B60Q 1/06* (2006.01)
*F21V 21/26* (2006.01)
*F21V 21/02* (2006.01)
*F21Y 101/02* (2006.01)

(52) U.S. Cl.
CPC ............... *F21V 21/26* (2013.01); *F21V 21/02* (2013.01); *F21Y 2101/02* (2013.01)

(58) Field of Classification Search
CPC .... F21Y 2101/02; F21V 21/30; F21V 21/29; F21V 21/26
USPC ............. 313/371, 368, 370, 217.16, 249.02, 313/220, 282, 427
See application file for complete search history.

(56) References Cited

U.S. PATENT DOCUMENTS 5,381,322 A 1/1995 Humphreys
5,550,725 A 8/1996 Shemitz et al.
D659,280 S 5/2012 Guercio et al.

OTHER PUBLICATIONS

Econolight 56-Watt Cool White Roundback Floodlight; Product Specification; Sep. 24, 2012.

*Primary Examiner* — Vip Patel
(74) *Attorney, Agent, or Firm* — King & Spalding LLP

(57) ABSTRACT

A luminaire comprises a light fixture that includes a housing. The housing includes a light emitting diode (LED) light source and a back wall that has a first surface shape. The luminaire further comprises a mounting system that includes a surface mounting bracket, or a tie rod that has a first end that includes a plurality of teeth. The mounting system also includes a mounting plate rotatably coupled to the surface mounting bracket or to the tie rod. The mounting plate is coupled to the back wall of the housing. The mounting plate has a second surface shape, where the first surface shape and the second surface shape are substantially the same.

9 Claims, 18 Drawing Sheets

ADJUSTABLE MOUNTING SYSTEM FOR A LUMINAIRE

RELATED APPLICATIONS

The present application claims priority to U.S. patent application Ser. No. 13/854,290, filed Apr. 1, 2013, and titled "Adjustable Mounting System For A Luminaire," which claims priority to U.S. Provisional Patent Application No. 61/619,018, filed Apr. 2, 2012, and titled "Systems, Methods, And Devices For Providing An Adjustable Mounting System For A Luminaire," the entire contents of which are incorporated herein by reference.

TECHNICAL FIELD

The present disclosure relates generally to lighting solutions, and more particularly to systems, methods, and devices for adjustably mounting a luminaire or retrofitting a luminaire with an adjustable mounting device.

BACKGROUND

Some light fixtures are designed for mounting on a surface such as a wall. Such light fixtures may be attached to a wall, for example, by one or more fasteners that extend through a back wall of a housing of the light fixture. For example, fasteners may be inserted by opening the housing of the light fixture and driving the fasteners through apertures in the back surface of the housing to attach the housing to the wall. With some light fixtures, once the light fixture is attached to the wall, adjustment of the direction of light from the light fixture generally not possible.

Thus, a mounting system that enables attachment of such light fixtures as floodlight fixtures that are adjustable to change direction of light from the light fixtures is desirable.

BRIEF DESCRIPTION OF THE FIGURES

Reference will now be made to the accompanying drawings, which are not necessarily drawn to scale, and wherein.

Figure 1:
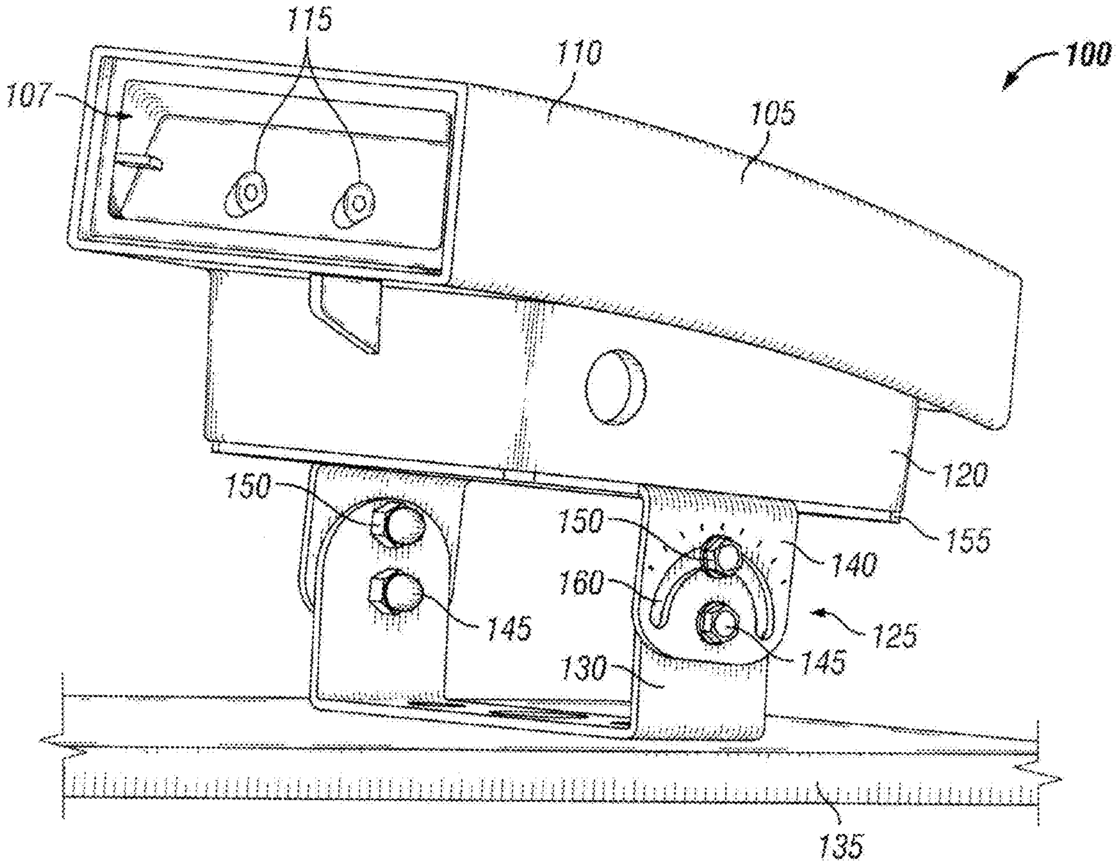
FIG. 1 is a perspective view a luminaire with trunnion mounting system in accordance with an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, reference numerals designate like or corresponding, but not necessarily identical, elements.

SUMMARY

The present disclosure relates to adjustably mounting a luminaire or retrofitting a luminaire with an adjustable mounting device. In an example embodiment, a luminaire includes a light fixture that includes a housing. The housing includes a light emitting diode (LED) light source and a back wall having a first surface shape. The luminaire also includes a trunnion mounting system that includes a surface mounting bracket and a mounting plate rotatably coupled to the surface mounting bracket. The mounting plate has a second surface shape, where the mounting plate is coupled to the back wall of the housing and where the first surface shape and the second surface shape are substantially the same.

In another example embodiment, a luminaire includes a light fixture that includes a housing. The housing includes a light emitting diode (LED) light source and a back wall having a first surface shape. The luminaire also includes a knuckle mounting system that includes a tie rod having a first end that includes a plurality of teeth, and a mounting plate rotatably coupled to the tie rod. The mounting plate has a second surface shape, where the mounting plate is coupled to the back wall of the housing, and where the first surface shape and the second surface shape are substantially the same.

In another example embodiment, a method of installing a wall mounted light fixture as a floodlight includes attaching a surface mounting bracket to a mounting surface and attaching a back wall of a housing of the wall mounted light fixture to a mounting plate that is rotatably attached to the surface mounting bracket. A surface shape of the mounting plate and a surface shape of the back wall of the housing are substantially the same and the mounting plate has dimensions that substantially match perimeter of the back wall of the housing.

These and other aspects, objects, features, and embodiments will be apparent from the following description and the appended claims.

DETAILED DESCRIPTION OF EXAMPLE EMBODIMENTS

Example embodiments disclosed herein are directed to a light emitting diode (LED) luminaire or light fixture and devices for rotatably mounting the light fixture to a pole or surface. The example embodiments provide the capability to modify a typically wall-mounted light fixture for use as a rotatably adjustable flood light.

FIGS. 1-9C provide various views of a luminaire with trunnion mounting system in accordance with one example embodiment. Referring now to FIGS. 1-8 and 9A-C, the luminaire 100 includes a light fixture 105 coupled to a trunnion mounting system 125. The light fixture 105 includes a fixture housing 110, one or more light sources 115 and an electrical component housing 120. In an example embodiment, the fixture housing 110 and the electrical component housing 120 may be a single housing. In certain example embodiments, the fixture housing 110 acts as a heat sink. For example, the fixture housing 110 can have a front side and an opposing back side. The front side can include a plurality of fins that can extend vertically along all or a portion of the front side of the housing 110.

In certain example embodiments, the light sources 115 are LED light sources are an disposed generally along a bottom side 307 of the fixture housing 110, within a light cavity 107, to emit light generally down from the housing to a desired area to be illuminated. The light sources 115 can be LED chip on board, LED arrays or discrete LEDs positioned along the bottom side of the fixture housing 110 and can further include one or more substrates, such as a PCB or MCPCB, for providing electrical power and control to the light sources 115. While not shown, the lighting cavity 107 can also include one or more reflectors disposed within the cavity and a lens covering the entrance to the cavity 107 from the bottom side 307 of the fixture housing 110. In certain example embodiments, the lens is a glass or polycarbonate lens.

Figure 11A:
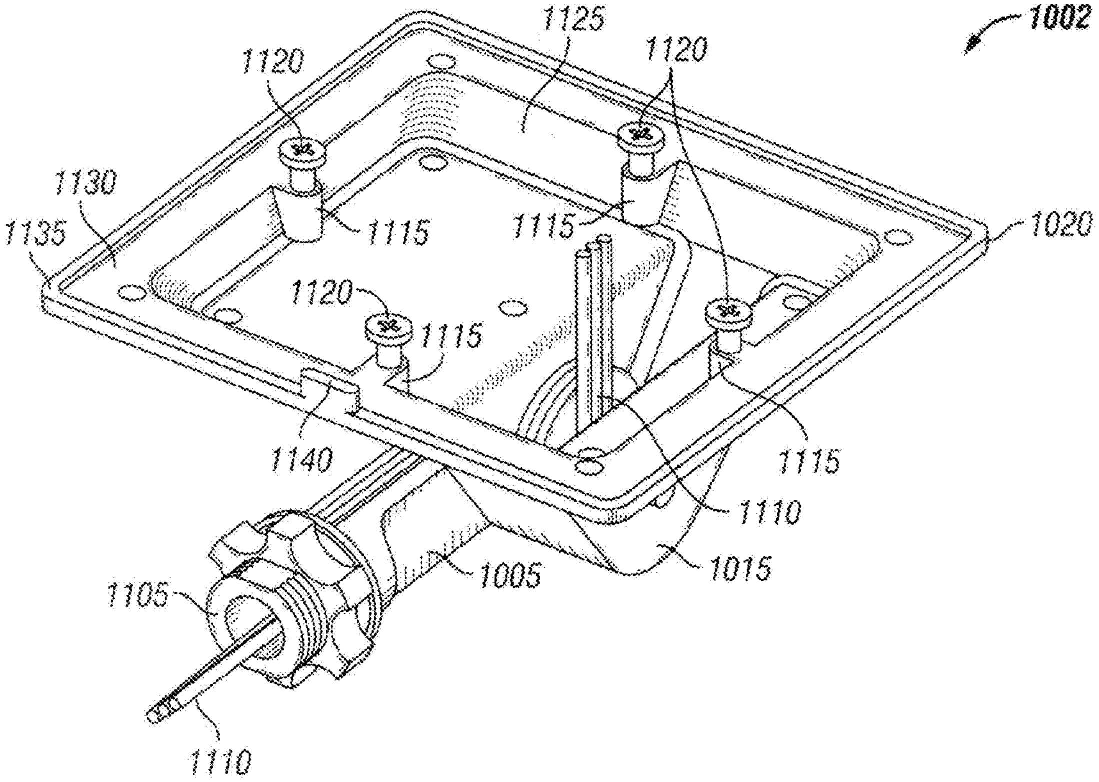
FIGS. 11A and 11B are perspective views of the knuckle mounting system and the electrical box housing for the luminaire in accordance with an example embodiment.
Figure 11B:
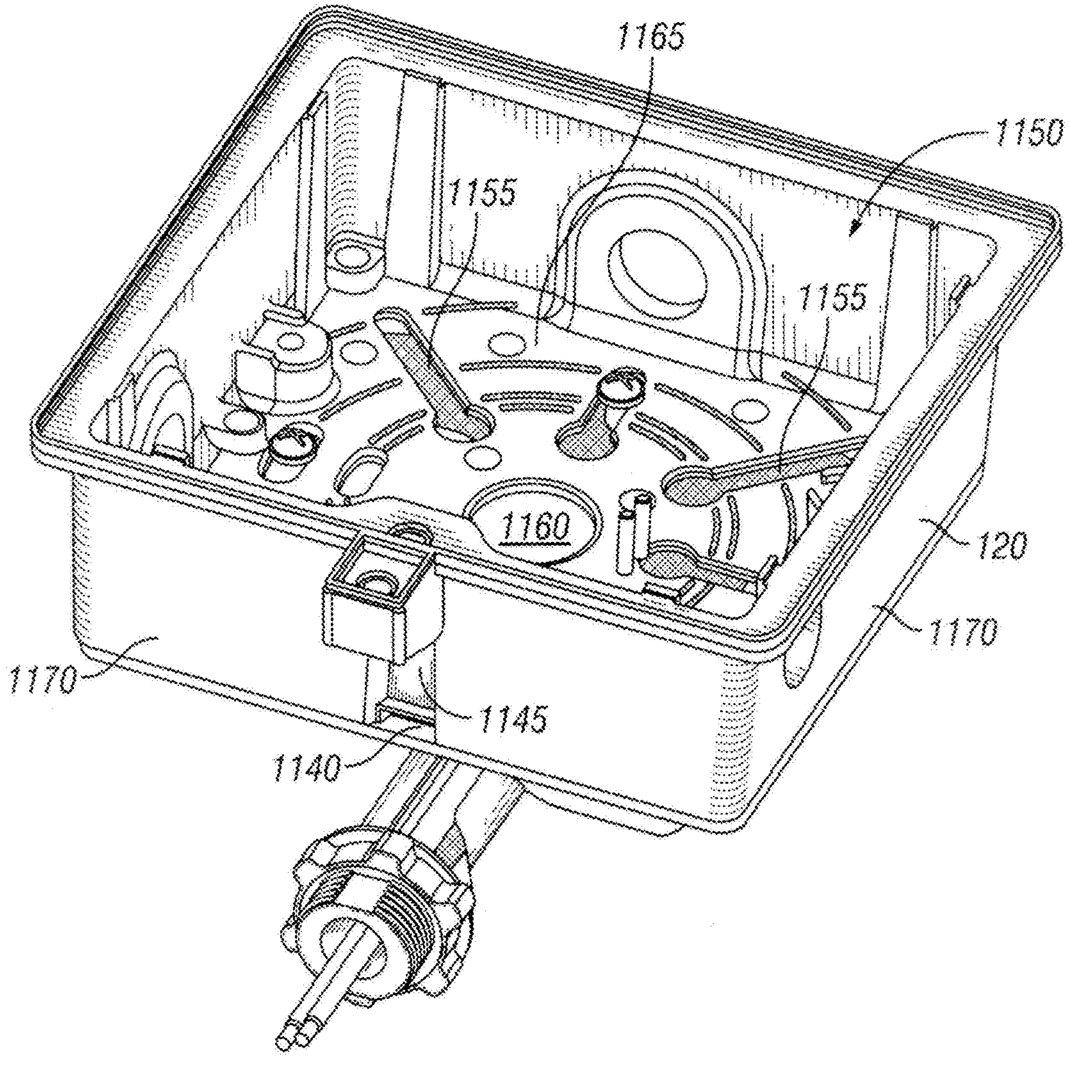

The electrical component housing 120 or "back-box" can be removably coupled to the back side of the fixture housing 110. In certain example embodiments, the back-box 120 is removably coupled to the fixture housing 110 using coupling devices, which can include screws, bolts, clips, cotter pins, tabs and slots or any other coupling devices known to those of ordinary skill in the art. As best seen in FIG. 11B, the back box 120 can have a back wall 1165 and four side walls 1170 extending out from the back wall 1165. The back wall 1165 and four side walls can define a cavity 1150 for containing electrical components (such as wires, LED drivers, and the like) for receiving a source of power and providing that power to the light sources 115.

The back box 120 can also include a recess 1145 along one of the side walls 1170 for receiving a tab (as best described hereinafter with regard to FIGS. 10-14). The recess 1145 can be an indentation along the surface of the side wall 1170 that is sized and shaped to receive and hold or prevent undue movement of the tab. The back box 120 can also include one or more elongated slot apertures 1155 that can receive a portion of a screw or other coupling device therethrough to couple the back box 120 to the trunnion mounting system 125, a knuckle mounting system 1002 (see FIGS. 10-14C) or an electrical junction box (not shown). The back box 120 also includes one or more conduit apertures 1160 for receiving electrical wiring therethrough.

The trunnion mounting system 125 includes a surface mounting bracket 130 and a mounting plate 155 rotatably coupled to the surface mounting bracket 130. The surface mounting bracket 130 can be a u-shaped bracket and can include elongated apertures 220 for mounting the bracket 130 to a wall, floor, ceiling or any other type of surface with bolts, screws or other coupling devices and a conduit aperture 905 for receiving electrical wiring therethrough. The surface mounting bracket 130 can be made from metal or plastic and can be a single piece or two separate pieces, which could then be generally in the form of two L-shaped brackets.

The mounting plate 155 can be symmetrical. In certain example embodiments, the mounting plate 155 is square and/or is sized and shaped to match the size and shape of the back wall 1165 of the back box 120. In addition, or in the alternative, the mounting plate 155 is sized and shaped to cover the entire back gasket disposed along the exterior of the back wall 1165 of the back box 120 to provide a water-tight or water resistant seal between the back wall 1165 and the mounting plate 155.

Figure 2:
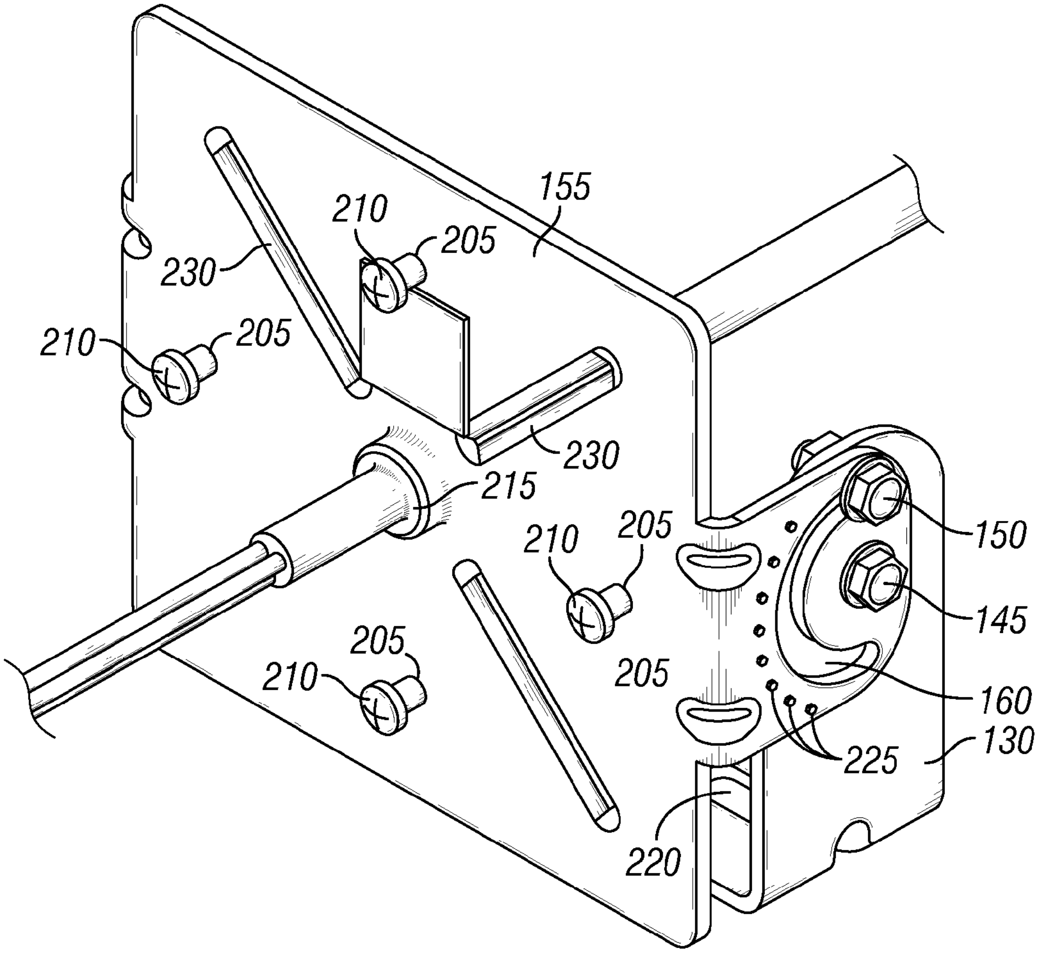
FIG. 2 is a perspective view of the trunnion mounting system in accordance with an example embodiment.

As best seen in FIG. 2, the mounting plate 155 includes one or more screw bosses 205 that can each receive a screw 210 for coupling the mounting plate 155 to the back wall 1165 of the back box 120. In certain example embodiments, the mounting plate 155 includes four screw bosses 205 and the head of the screw 210 can be positioned inside the cavity 1150 of the back box 120 to couple the back box 120 to the mounting plate 155. The mounting plate 155 can also include one or more elongated protrusions 230 extending up from a front surface of the mounting plate 155. Each elongated protrusion 230 can be sized and shaped to fit into or cover the elongated slot apertures 1155 in the back wall 1165 of the back box 120 to further seal the back box 120 from water.

The mounting plate 155 can also include two adjustment brackets 140 coupled to and extending orthogonally or substantially orthogonally out from opposing sides of the mounting plate 155. Each adjustment bracket 140 can include an arcuate slot aperture 160 and a pivot point aperture 145. In certain example embodiments, the arcuate slot aperture 160 spans an arc of between 90-270 degrees and in certain embodiments about 180 degrees. The adjustment bracket 140 can further include tick marks 225 or other means for indicating the amount of rotation of the mounting plate 155 with respect to the surface mounting bracket 130. In one example embodiment, each tick mark 225 represents a fifteen degree rotation. Each adjustment bracket 140 is rotatably coupled to one of the vertical portions or arms of the surface mounting bracket 130 with bolts, screws or other coupling devices at the aperture 145. This coupling at the aperture 145 can function as the pivot point between each adjustment bracket and its respective portion of the surface mounting bracket 130. Another coupling device 150, such as a screw or bolt can be coupled to the surface mounting bracket 130 and extend through the arcuate slot aperture 160 to control the rotation of the mounting plate 155 with respect to the surface mounting bracket 130.

Figure 5:
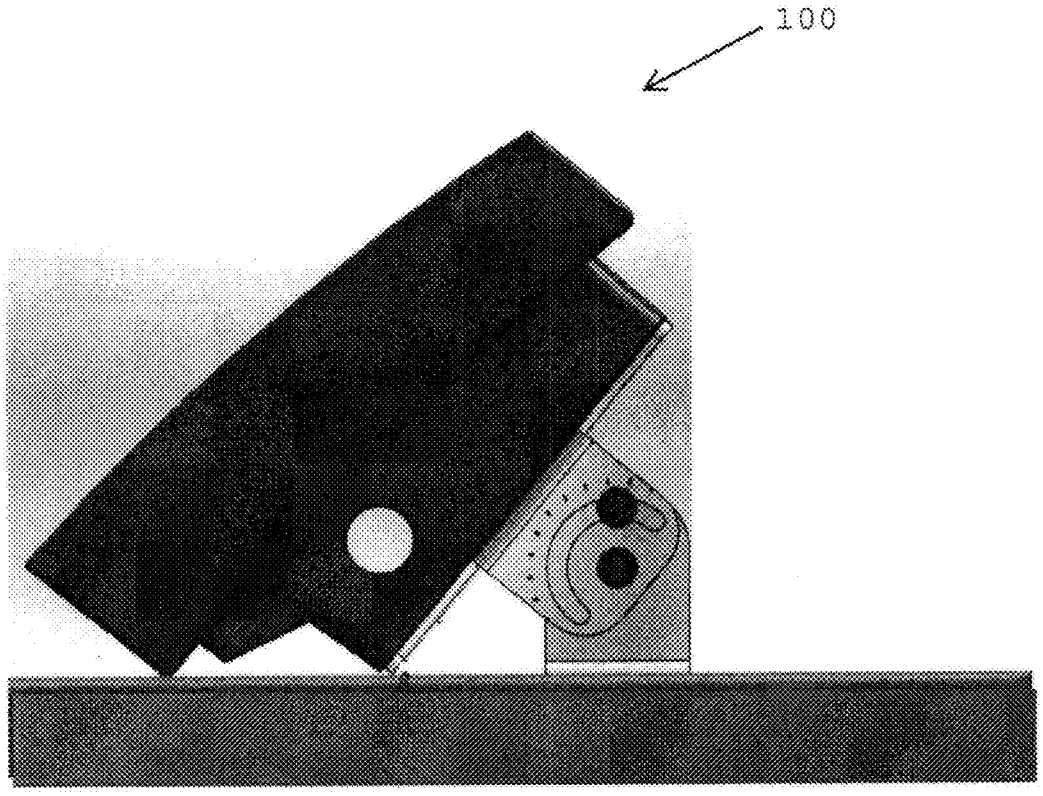
FIG. 5 is a side elevation view of the luminaire with trunnion mounting system of FIG. 1 showing the rotational capabilities in accordance with an example embodiment.
Figure 6:
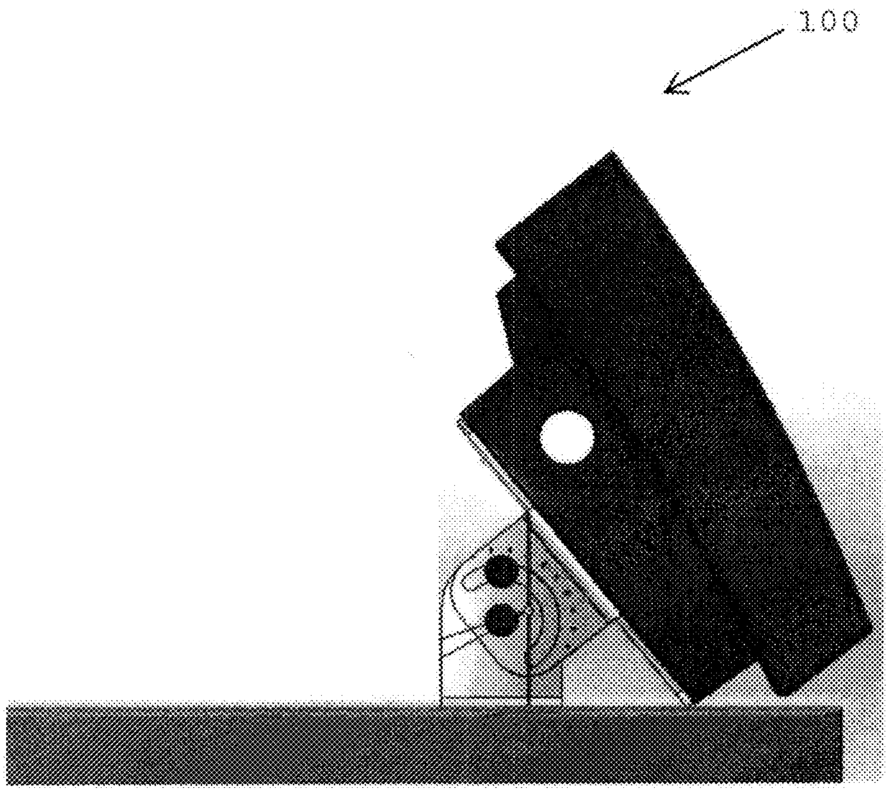
FIG. 6 is another side elevation view of the luminaire with trunnion mounting system of FIG. 1 showing the rotational capabilities in accordance with an example embodiment.
Figure 7:
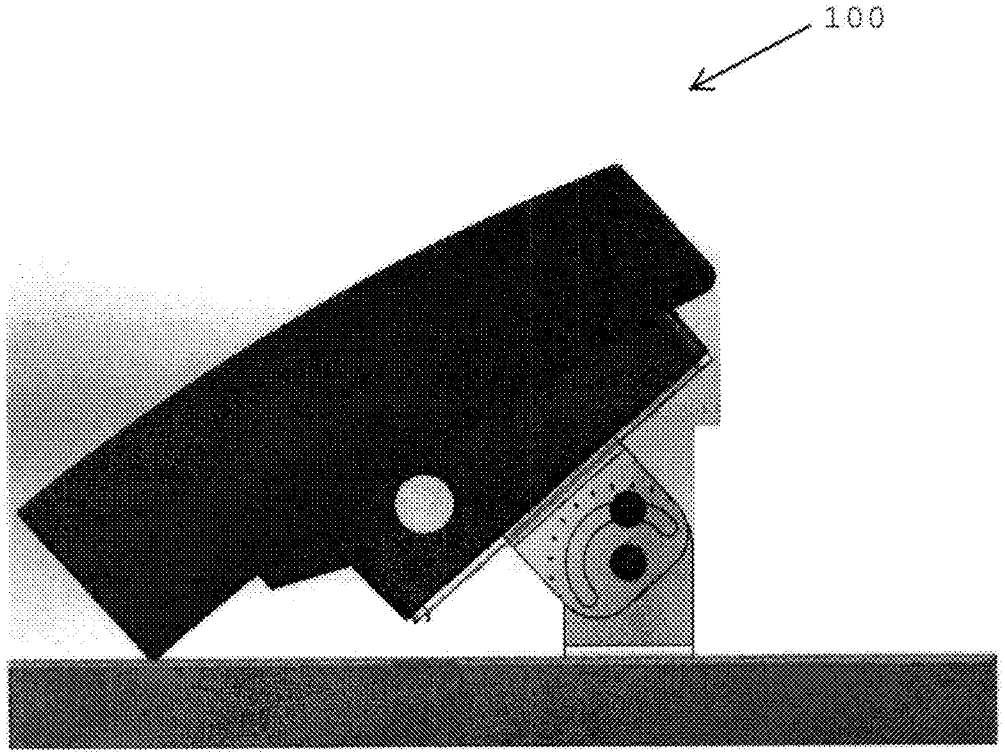
FIG. 7 is a side elevation view of a luminaire having a large housing and with a trunnion mounting system showing the rotational capabilities in accordance with an example embodiment.
Figure 8:
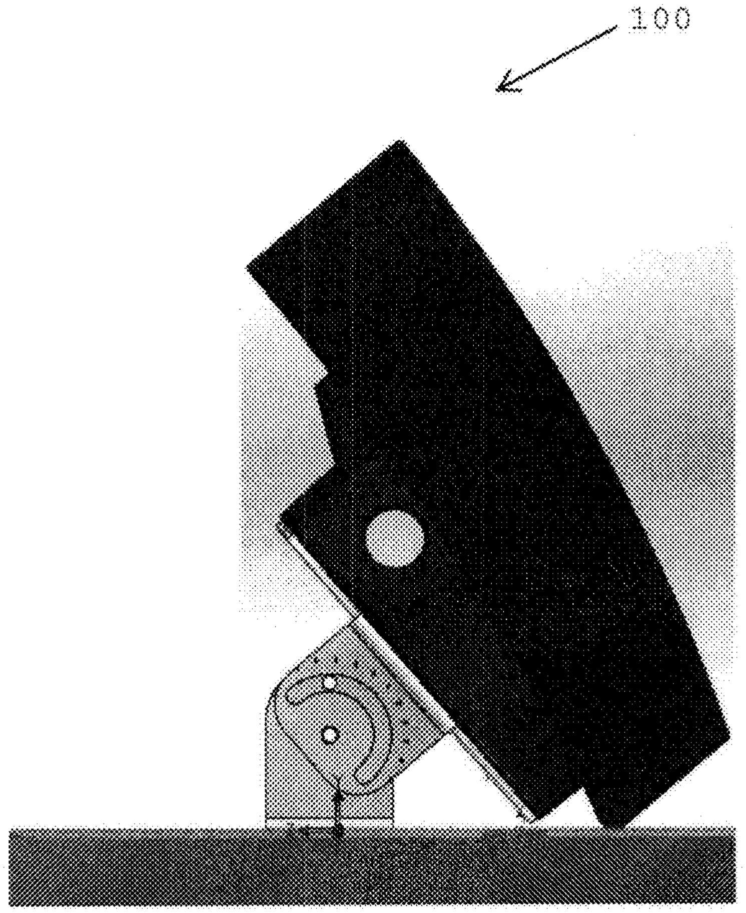
FIG. 8 is another side elevation view of the luminaire with large housing and with trunnion mounting system of FIG. 7 showing the rotational capabilities in accordance with an example embodiment.
Figure 9C:
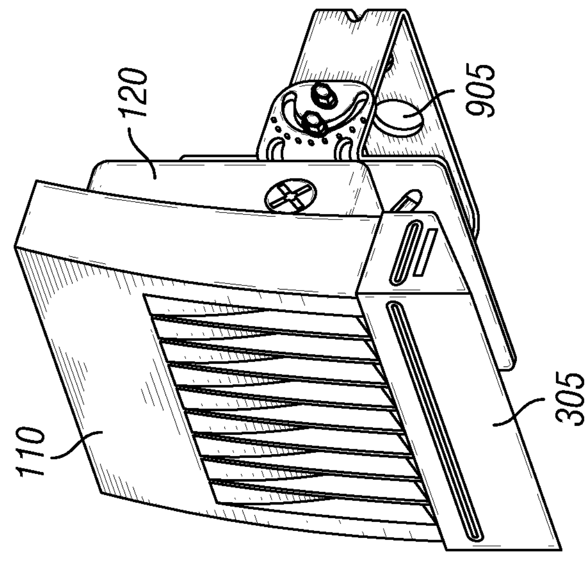
FIGS. 9A-C are additional views of the luminaire with trunnion mounting system of FIG. 1 in accordance with an example embodiment.
Figure 9B:
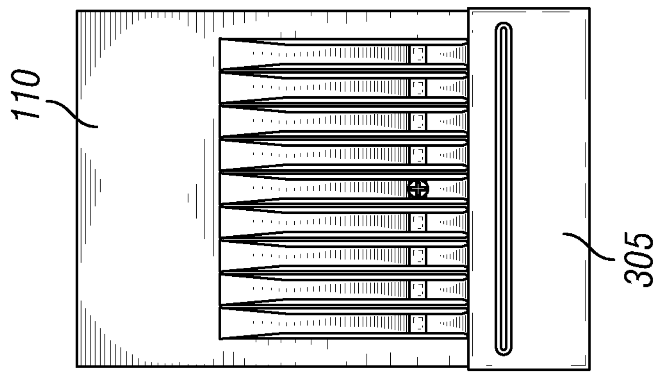
Figure 9A:
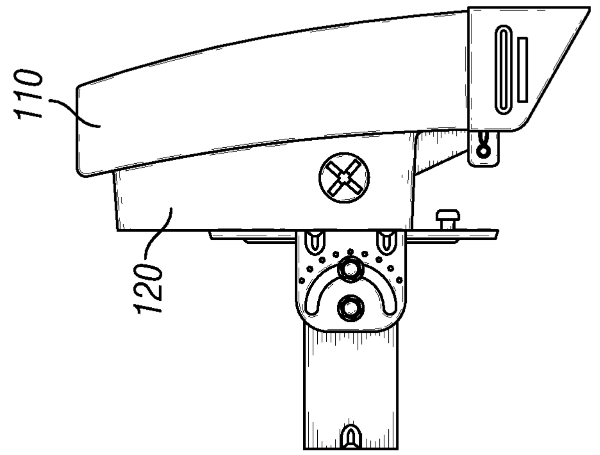
Figure 10:
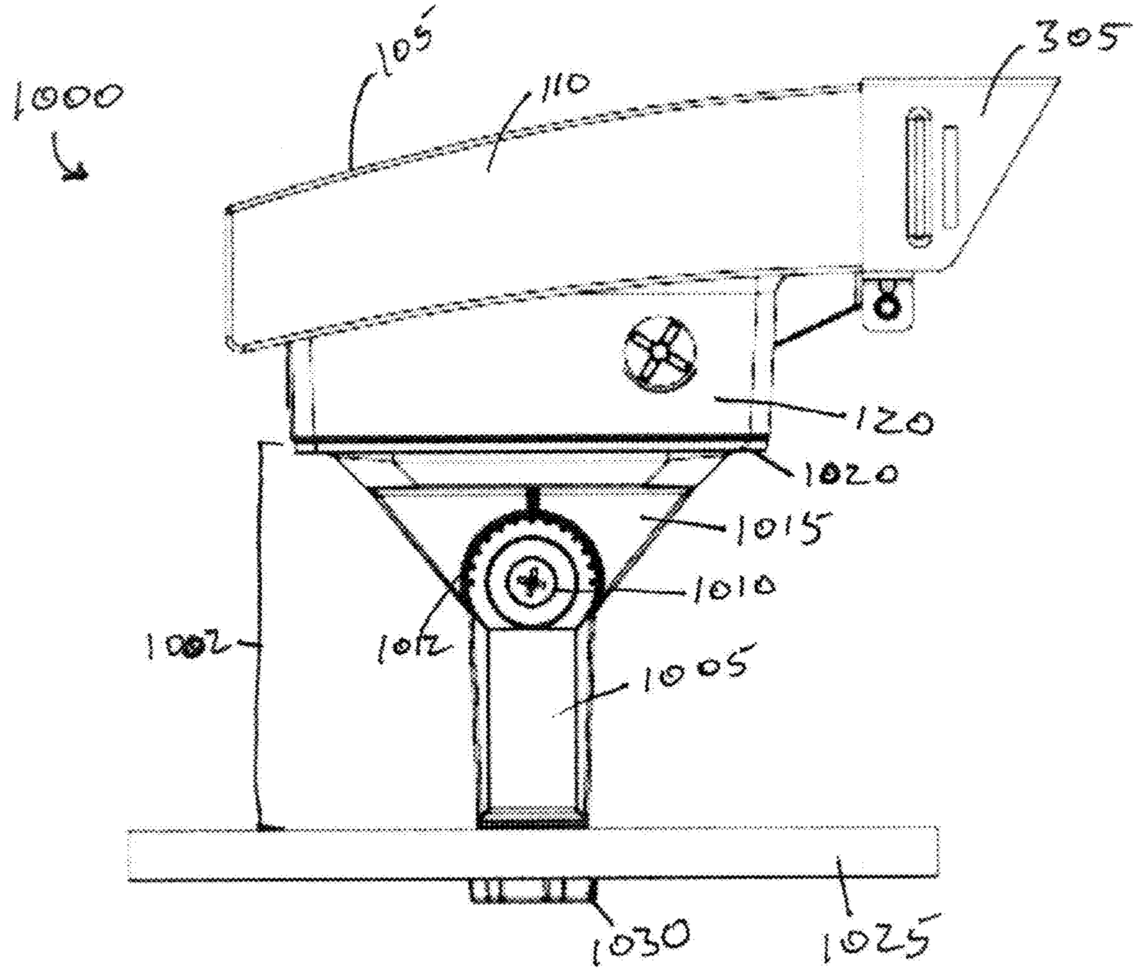
FIG. 10 is a side elevation view of a luminaire with knuckle mounting system in accordance with an example embodiment.

When the light fixture 105 is coupled to the trunnion mounting system 125 by way of coupling the back box 120 to the mounting plate 155, the light fixture 105 can be rotatable about one axis, through the pivot point 145. One way to rotate the fixture 105 is to loosen the coupling device 150, then adjust the light fixture 105 to the desired position and then re-tighten the coupling device 150. FIGS. 4-8 provide views of different positions of adjustment for the luminaire 100 using the trunnion mounting system 125. For example, FIGS. 5 and 6 show a smaller fixture housing 110, such that the mounting plate 155 contacts the surface 135 along opposing limits of rotation. FIGS. 7 and 8 present a larger fixture housing 110 such that the fixture housing 110 itself contacts the surface 135 along opposing limits of rotation. Those of ordinary skill in the art will recognize that, absent other changes, making the vertical portions of each surface mounting bracket 130 longer and moving the pivot point 145 further away (vertically) from the surface 135, can provide an increased range of rotation for the light fixture 105. In certain example embodiments, the light fixture 105 has a range of rotation of between 90-270 degrees. Alternatively, the light fixture 105 has a range of rotation of between 90-180 degrees. For example, in one embodiment, the light fixture 105 may rotate between 0 degree and 180 degrees relative to an initial position of the light fixture 105.

The trunnion mounting system 125 can be provided with the light fixture 105 or sold as a separate retrofit kit to change the light fixture 105 from a wall-mounted light fixture to a rotatably adjustable flood light. In either event, the trunnion mounting system 125 can also include the visor system 305, which is described in greater detail below in FIG. 15.

FIGS. 10-14C provide various views of a luminaire with knuckle mounting system in accordance with example embodiments. Referring now to FIGS. 10-14C, the luminaire 1000 includes a light fixture 105 coupled to a knuckle mounting system 1002. The light fixture 105 is substantially the same as that described above with regard to FIGS. 1-9 and will not be repeated. The knuckle mounting system 1002 can include a tie rod 1005, a set of teeth 1012 along one end of the tie rod 1005, a knuckle stem 1015 rotatably and adjustably coupled to the teeth 1012, and a mounting plate 1020 coupled to the knuckle stem 1015.

The mounting plate 1020 can include a mounting surface 1130 and a lip 1135 extending up from the mounting surface 1130. One or more screw bosses 1115 can be coupled to or positioned adjacent the mounting surface 1130. The example embodiment can include four screw bosses 1115, each capable of receiving a screw 1120 or other coupling device for removably coupling the mounting plate 1020 to the back wall 1165 (shown in FIG. 11B) of the back box 120. In certain example embodiments, the mounting plate 1020 can have side walls 1125 that extend vertically or angularly out from a center portion of the mounting plate 1020 and provide a cavity in the mounting plate 1020 to hold or provide a pathway for electrical components, such as wires 1110.

The example mounting plate 1020 can also include an alignment feature to align the mounting plate 1020 with the back wall 1165 of the back box 120. In certain example embodiments, the alignment feature is an alignment tab 1140. The alignment tab 1140 can extend orthogonally or angularly up from a front surface of the mounting plate 1020, such as from the lip 1135. The alignment tab 1140 can be sized and shaped to fit into the recess 1145 along one of the side walls 1170 of the back box 120. By placing the alignment tab 1140 within the recess 1145, the screw bosses 1115 will be aligned with the screw apertures in the back wall 1165 of the back box 120. While the example alignment feature has been described with reference to the mounting plate of the knuckle mounting system 1002, the alignment feature could also be similarly used with and included on the mounting plate 155 of the trunnion mounting system 125 of FIG. 1.

In certain example embodiments, the mounting plate 1020 is square and/or is sized and shaped to match the size and shape of the back wall 1165 of the back box 120. In addition, or in the alternative, the mounting plate 1020 is sized and shaped to cover the entire back gasket disposed along the exterior of the back wall 1165 of the back box 120 to provide a water-tight or water resistant seal between the back wall 1165 and the mounting plate 1020.

The knuckle stem 1015 extends from a back side of the mounting plate 1020 and can be integrally formed with the mounting plate 1020 or coupled to the mounting plate 1020. The knuckle stem 1015 can include a set of teeth (not shown) that are complimentary to and engage the teeth 1012 on one end of the tie rod 1005. Both the tie rod 1005 and the knuckle stem 1015 can include complimentary apertures for receiving a coupling device 1010, such as a screw or bolt. One or both of the complimentary apertures can be threaded or through holes. The coupling device 1010 can define the axis of rotation for the light fixture 105 with respect to the tie rod 1005. The end opposite the teeth 1012 on the tie rod can be threaded 1105 and can be coupled to a surface 1025 either by providing a threaded aperture in the surface or by extending the threaded end 1105 through an aperture in the surface and coupling a nut 1030 to the threaded portion 1105 of the tie rod 1005. In certain example embodiments, the tie rod 1005 can include a hollow portion for routing electrical wires 1110 through the tie rod 1005 and the mounting plate 1020 to the back box 120 to provide electrical power to the light source 115 in the light fixture 105.

Figure 12:
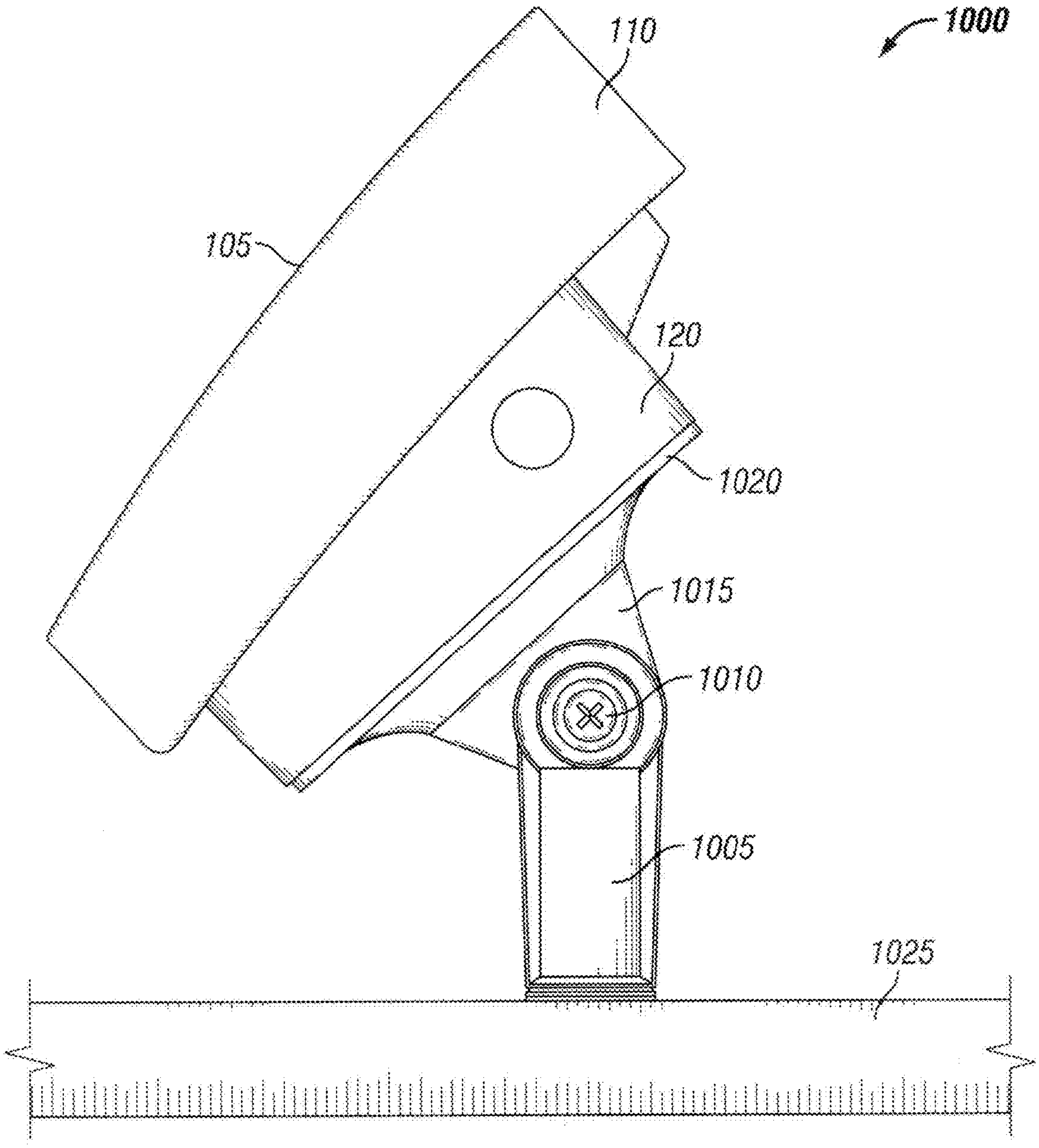
FIG. 12 is another side elevation view of the luminaire with knuckle mounting system of FIG. 10 showing the rotational capabilities in accordance with an example embodiment.
Figure 13:
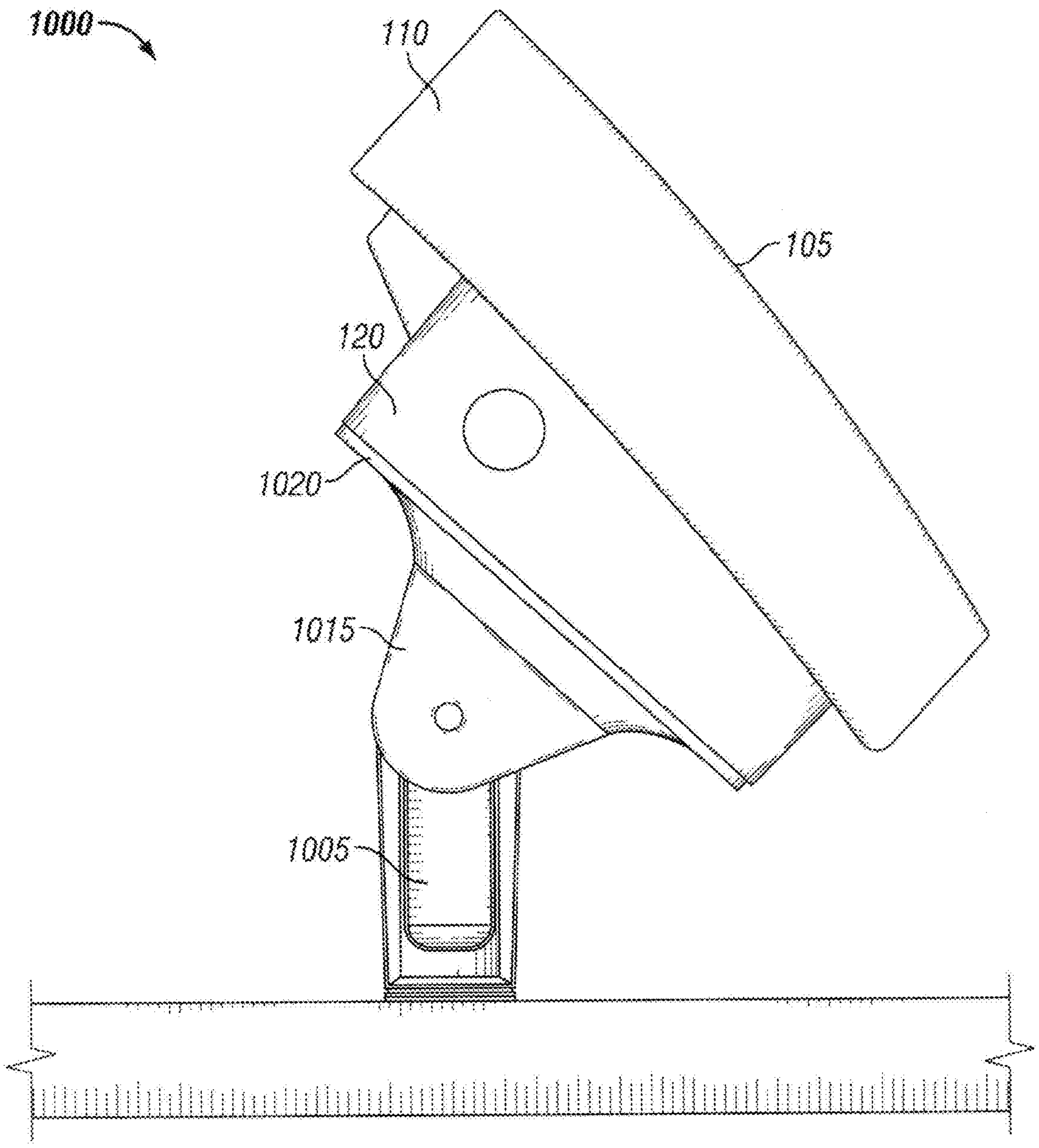
FIG. 13 is an opposing side elevation view of the luminaire with knuckle mounting system of FIG. 12 in accordance with an example embodiment.
Figure 14C:
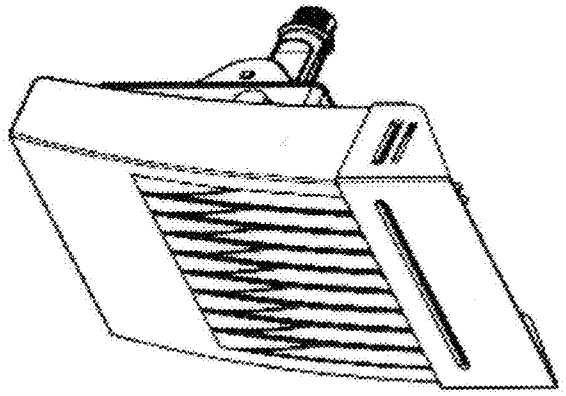
FIGS. 14A-C are additional views of the luminaire with knuckle mounting system of FIG. 10 in accordance with an example embodiment.
Figure 14B:
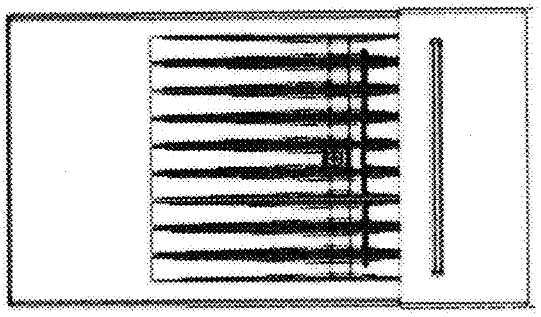
Figure 14A:
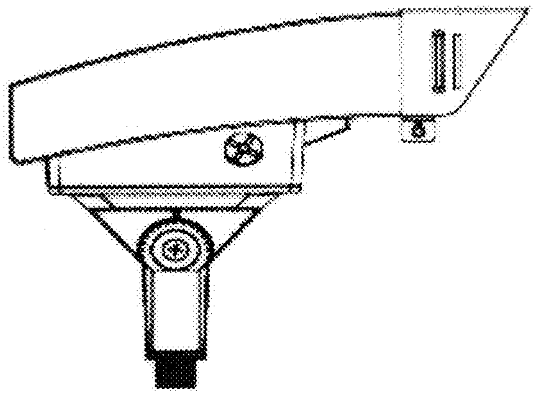

FIGS. 12 and 13 present different views of the rotational capability of the light fixture 105 using the knuckle mounting system 1002. For example a person can loosen the coupling device 1010, which causes the teeth 1012 on the tie rod 1005 to disengage from the complimentary teeth on the knuckle stem 1015. The light fixture 1015 can then be rotated to the desired position about an axis substantially at the aperture for the coupling device 1010. Then the coupling device 1010 can be tightened such that the teeth 1012 on the tie rod 1005 re-engage the teeth on the knuckle stem 1015 to hold the light fixture 105 in place. Those of ordinary skill in the art will recognize that, absent other changes, making the vertical length of the tie rod 1005 longer and moving the pivot point 1010 further away (vertically) from the surface 1025, can result in an increased range of rotation for the light fixture 105. In certain example embodiments, the light fixture 105 has a range of rotation of between 90-270 degrees. Alternatively, the light fixture 105 has a range of rotation of between 90-180 degrees. For example, in one embodiment, the light fixture 105 may rotate between 0 degree and 90 degrees relative to an initial position of the light fixture 105.

The knuckle mounting system 1002 can be provided with the light fixture 105 or sold as a separate retrofit kit to change the light fixture 105 from a wall-mounted light fixture to a rotatably adjustable flood light. In either event, the knuckle mounting system 1002 kit can also include the visor system 305, which is described in greater detail below in FIG. 15.

Figure 3:
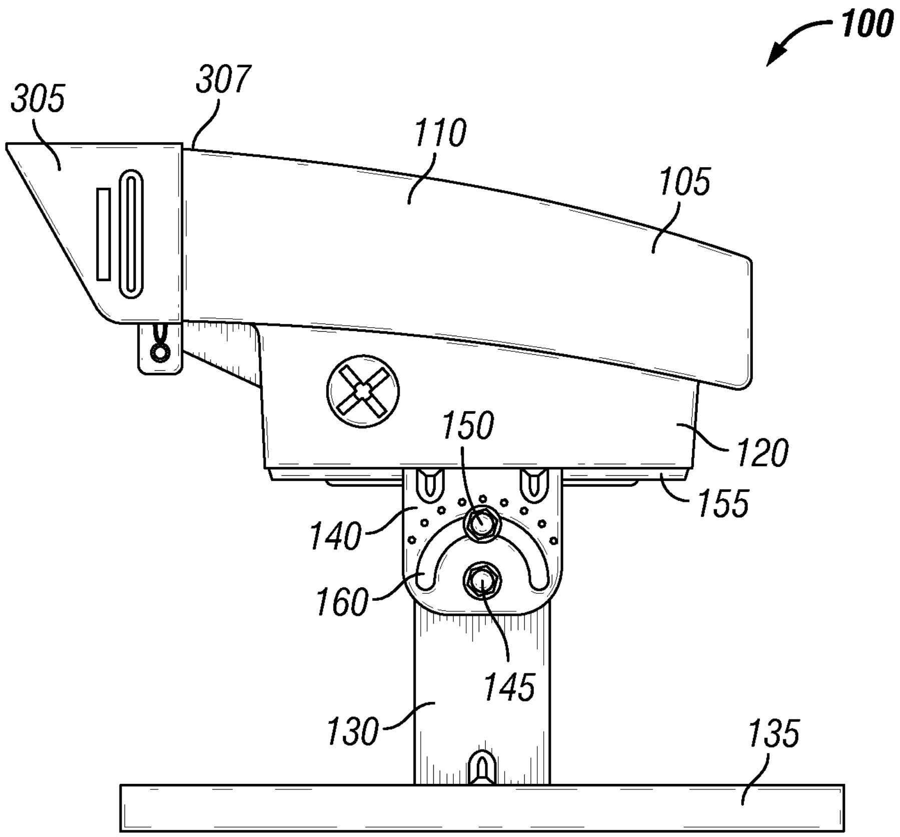
FIG. 3 is a side elevation view of the luminaire with trunnion mounting system of FIG. 1 in accordance with an example embodiment.
Figure 4:
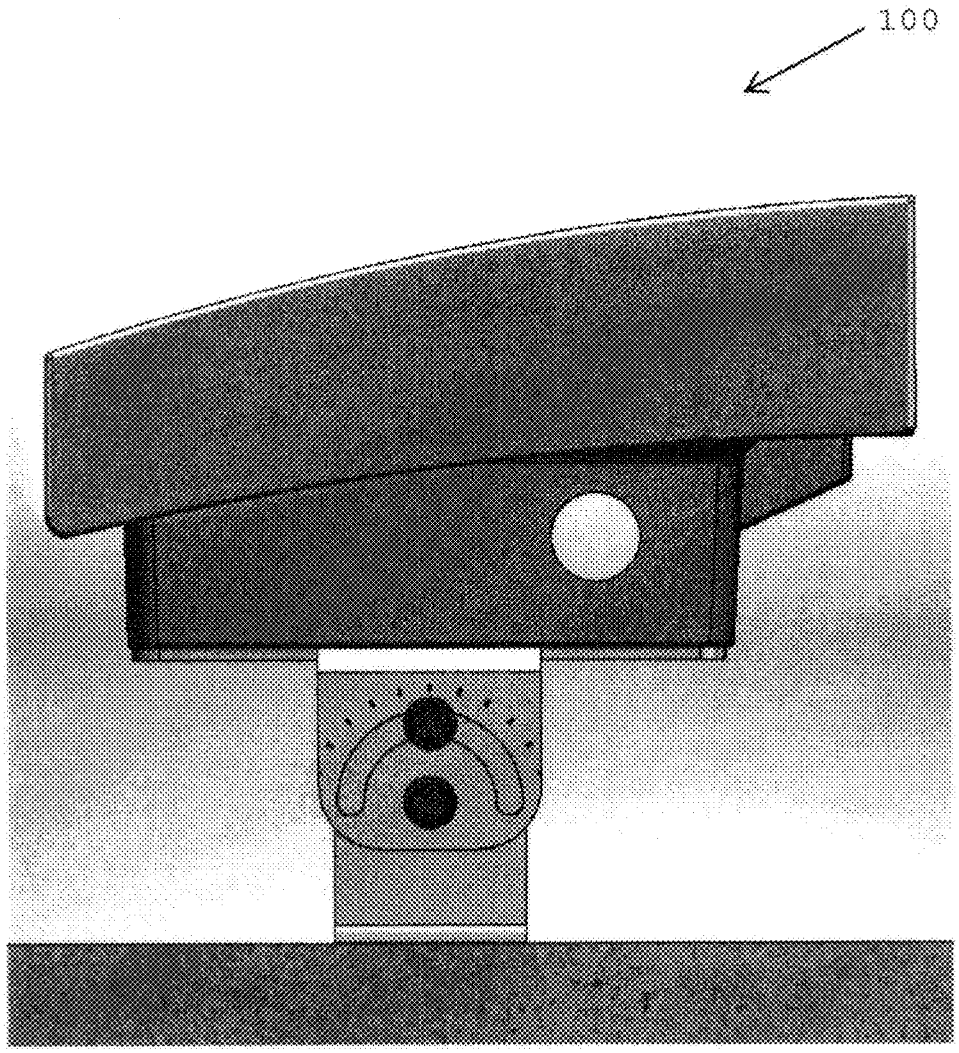
FIG. 4 is an opposing side elevation view of the luminaire with trunnion mounting system of FIG. 3 in accordance with an example embodiment.
Figure 15:
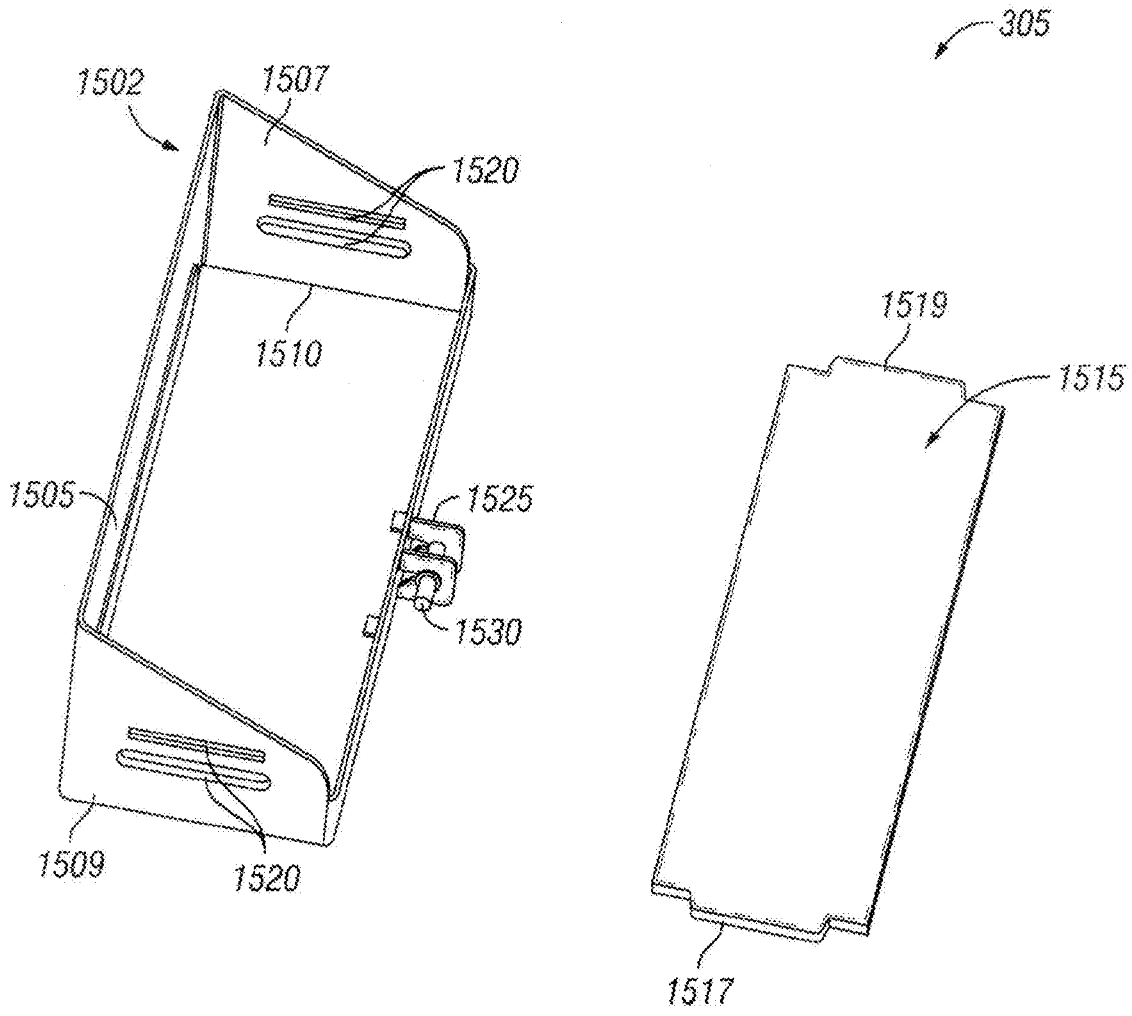
FIG. 15 illustrates a visor system in accordance with an example embodiment.

FIG. 15 illustrates a visor system 305 that can be removably coupled to the light fixture 105 in accordance with certain example embodiments. Referring now to FIGS. 3 and 15, the example visor system 305 can be used in conjunction with the trunnion mounting system 125 or the knuckle mounting system 1102 or without either and just with the light fixture 105. The visor system 305 includes a visor 1500 and an optional impact guard 1515. The visor 1500 can be removably coupled to the bottom end 307 of the fixture housing 110 and generally disposed about the area housing the light sources 115. The visor 1500 includes a first end 1510 that is positioned about the exterior of the bottom end 307 of the fixture housing 110. The visor 1500 can then be clamped or coupled to the fixture housing 110 by tightening a screw or other coupling device 1530 through the clamping mechanism 1525. For example, as the coupling device 1530 is tightened in the clamping mechanism 1525, the inner diameter of the first end 1510 of the visor 1500 is reduced, thereby securing the visor 1500 to the bottom end 307 of the fixture housing 110.

The visor 1500 can include a longer side wall 1505 that extends out farther generally than the other side walls to reduce the amount of light emitted by the luminaire 100 in the direction of that side wall 1505. For example, the larger side wall 1505 can be used to reduce the amount of uplight emitted by the luminaire 100. As indicated above, the visor system 305 can optionally include the impact guard 1515. In certain example embodiments, the impact guard 1515 is an impact resistant lens that can be made from polycarbonate material. In certain example embodiments, the impact guard 1515 includes tabs 1517, 1519 that extend out from opposing edges of the impact guard 1515. Further, the visor 1500 can include slots 1520 in each of side walls 1507 and 1509. The impact guard 1515 can be coupled to the visor 1500 by slidably inserting the tabs 1517, 1519 into the respective slots 1520 in each of the respective side walls 1507, 1509. The impact guard 1515 provides a protective barrier in front of a glass lens (not shown) and the light sources 115 to protect each from damage and to reduce ingress of environmental elements into the area of the light source 115.

While not shown, the visor system 305 can be rotated 180 degrees and coupled to the bottom end 307 of the fixture housing 110 in a manner that does not provide uplight reduction but still positions the impact guard 1515 in front of the glass lens and the light sources 115 to prevent them from damage. The visor 1500 and the impact guard 1515 can have different sizes to fit different sizes of the fixture housing 110.

Figure 16E:
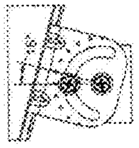
FIGS. 16A-F illustrate installation steps for a luminaire with trunnion mounting system in accordance with an example embodiment.
Figure 16B:
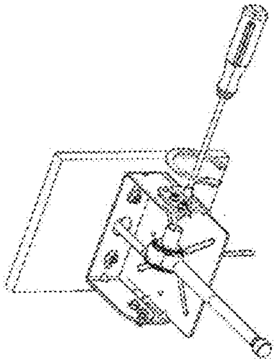
Figure 16D:
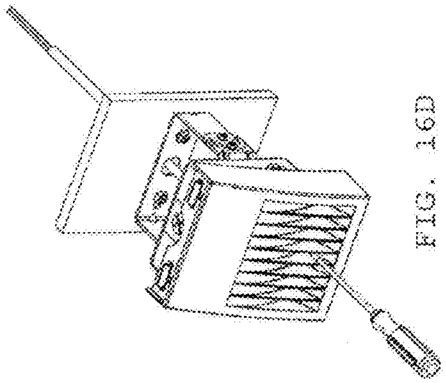
Figure 16A:
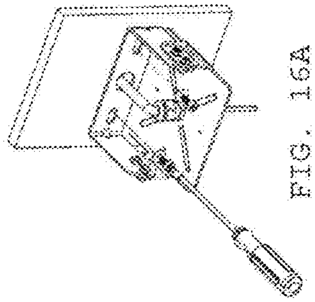
Figure 16C:
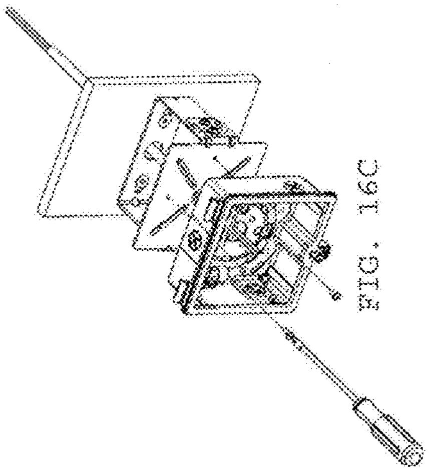
Figure 16F:
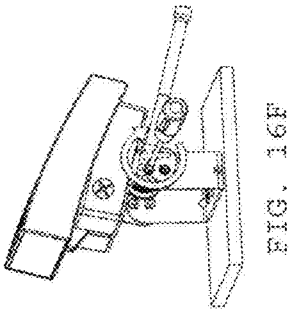

FIGS. 16A-F illustrate example installation steps of the luminaire with trunnion mounting system. FIG. 16A shows an attachment step of a surface mounting bracket, such as the surface mounting bracket 130, to a surface. FIG. 16B shows how the position of a mounting plate (e.g., the mounting plate 155) may be adjusted by loosing a coupling device (e.g., the coupling device 150 shown FIG. 1) using a tool such as a screw driver. For example, the mounting plate may be rotated to a position shown in FIG. 16C. FIG. 16C also shows how a first part (e.g., the back box 120) of the luminaire housing is attached to the mounting plate. FIG. 16D shows closure of the luminaire housing by attaching a second part (e.g., the fixture housing 110) of the luminaire housing to the first of the housing attached to the mounting plate. FIGS. 16E-F show how the luminaire housing can be rotated about the coupling device relative to the surface mounting bracket.

Figure 17A:
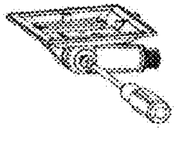
FIGS. 17A-I illustrate installation steps for a luminaire with knuckle mounting system in accordance with an example embodiment.
Figure 17B:
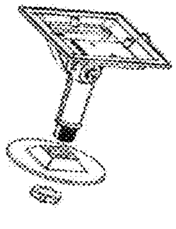
Figure 17C:
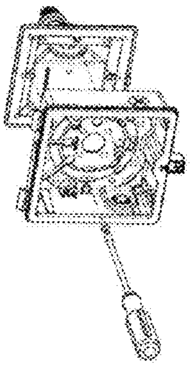
Figure 17D:
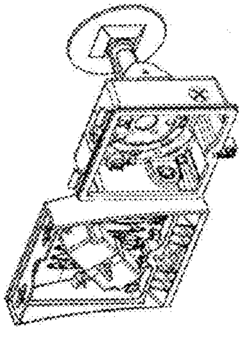
Figure 17E:
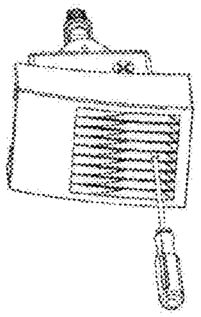
Figure 17F:
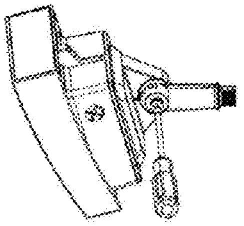
Figure 17G:
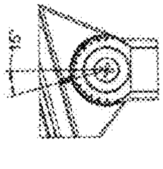
Figure 17H:
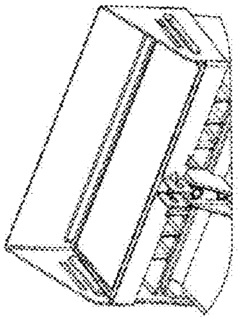
Figure 17I:
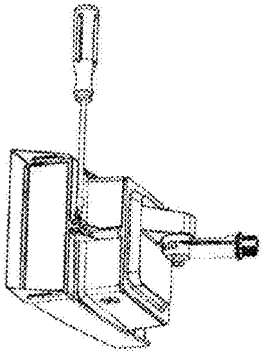

FIGS. 17A-I illustrate installation steps of the luminaire 100 with knuckle mounting system. FIG. 17A shows a tool (e.g., a screw driver) loosening a coupling device, such as the coupling device 1010 of FIG. 10, to rotate a mounting plate relative to a tie rod, such as the tie rod 1005. FIG. 17B shows how the knuckle mounting system may be attached to a surface using, for example, a nut. FIG. 17C shows attachment of a first part (e.g., the back box 120) of a luminaire housing to the mounting plate, such as the mounting bracket housing 1020. FIG. 17D shows part of the housing attached to the mounting plate, and a second part (e.g., the fixture housing 110) of the luminaire housing. FIG. 17E shows the luminaire housing fully installed. FIGS. 17F-G show how the luminaire housing can be rotated about the coupling device relative to the tie rod of the knuckle mounting system. FIGS. 17H-I show how a visor system, such as the visor system 305, may be attached to the luminaire housing.

Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

I claim:

1. A trunnion mounting system for a light fixture, the system comprising:

a surface mounting bracket having a first arm and a second arm;

a mounting plate rotatable with respect to the surface mounting bracket;

a first adjustment bracket coupled to and extending from the mounting plate; and a second adjustment bracket coupled to and extending from the mounting plate, wherein the first adjustment bracket is rotatably coupled to the first arm of the surface mounting bracket, wherein the second adjustment bracket is rotatably coupled to a second arm of the surface mounting bracket, and wherein the mounting plate is rotatable with respect to the surface mounting bracket by being coupled to the first adjustment bracket and the second adjustment bracket.

2. The trunnion mounting system of claim 1, wherein the first adjustment bracket includes an arcuate slot aperture.

3. The trunnion mounting system of claim 2, wherein the arcuate slot aperture spans an arc of approximately between 90-270 degrees.

4. The trunnion mounting system of claim 3, further comprising a first coupling device extending through the arcuate slot aperture, wherein the coupling device is loosened to rotate the mounting plate with respect to the surface mounting bracket and wherein the coupling device is tightened to prevent the mounting plate from rotating with respect to the surface mounting bracket.

5. The trunnion mounting system of claim 2, wherein the second adjustment bracket includes a second arcuate slot aperture.

6. The trunnion mounting system of claim 1, wherein the first adjustment bracket includes indicator marks for indicating an amount of rotation of the mounting plate with respect to the surface mounting bracket.

7. The trunnion mounting system of claim 1, wherein the mounting plate includes one or more elongated protrusions extending out from a front surface of the mounting plate and wherein each elongated protrusion is sized and shaped to fit into a corresponding elongated slot aperture in a back wall of a light fixture housing.

8. The trunnion mounting system of claim 1, wherein the mounting plate includes screw bosses for attaching the mounting plate to a light fixture housing.

9. The trunnion mounting system of claim 1, wherein the first adjustment bracket is rotatably coupled to the first arm of the surface mounting bracket at a first pivot point by a first coupling device and wherein the second adjustment bracket is rotatably coupled to the second arm of the surface mounting bracket at a second pivot point by a second coupling device.

* * * * *